US006414279B1

(12) United States Patent
Suzuki et al.

(10) Patent No.: US 6,414,279 B1
(45) Date of Patent: Jul. 2, 2002

(54) HEAT TREATMENT DEVICE OF THE LIGHT IRRADIATION TYPE

(75) Inventors: Shinji Suzuki, Kawasaki; Yoshiki Mimura, Yokohama, both of (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/503,741

(22) Filed: Feb. 15, 2000

(30) Foreign Application Priority Data

Feb. 16, 1999 (JP) .......................................... 11-037396
Nov. 2, 1999 (JP) .......................................... 11-311828

(51) Int. Cl.[7] .................................................. A21B 1/00

(52) U.S. Cl. ....................... 219/405; 219/390; 392/416; 118/724; 118/50.1

(58) Field of Search ................................ 219/390, 405, 219/411; 392/416, 418; 118/724, 725, 50.1

(56) References Cited

U.S. PATENT DOCUMENTS 3,761,678 A 9/1973 Eckles
3,862,397 A 1/1975 Anderson et al.
4,150,316 A 4/1979 Levin et al.
4,280,076 A * 7/1981 Walsh ........................ 313/114
4,496,609 A 1/1985 McNeilly et al.
4,503,807 A * 3/1985 Nakayama et al. ......... 118/719
5,155,336 A 10/1992 Gronet et al.
5,156,820 A * 10/1992 Wong et al. ........... 422/186.05

FOREIGN PATENT DOCUMENTS

FR 2 687 252 8/1993

* cited by examiner

*Primary Examiner*—Teresa Walberg
*Assistant Examiner*—Shawntina Fuqua
(74) *Attorney, Agent, or Firm*—Nixon Peabody LLP; David S. Safran

(57) ABSTRACT

A heat treatment device of the light irradiation type with a long service life, in which effective, adequate cooling of the lamps (10) prevents devitrification of the lamp emission portion, even if the power supplied to the lamps is increased to accelerate the temperature increase of the wafer, is achieved by the provision of air injection lines (14) in a mirror (11), in which the lamps are mounted, for blowing in air into the vicinity of the lamps (10), and at least one air exhaust line (23) for evacuation of air from the vicinity of the lamps (10).

8 Claims, 3 Drawing Sheets

HEAT TREATMENT DEVICE OF THE LIGHT IRRADIATION TYPE

BACKGROUND OF THE INVENTION

1. Field of the invention

The invention relates to a beat treatment device of the light irradiation type in which a semiconductor wafer (hereinafter called a wafer) is heated by light for layer formation, diffusion, baking and the like.

2. Description of Related Art

Heat treatment of the light irradiation type in the manufacture of semiconductors is conventionally done in broad areas, such as layer formation, diffusion, baking and the like.

In any of these treatments, a wafer is heated to a high temperature and treated. The wafer can be quickly heated by light irradiation. The temperature of the wafer can be raised after a dozen to a few dozen seconds to at least 1000° C. Furthermore, prompt cooling of the wafer can be achieved when light irradiation is stopped.

A conventional device for heat treatment of the light irradiation type is known, for example, in Japanese patent disclosure document HEI 6-93440 (U.S. Pat. No. 5,155,336). In FIG. 1 shows this device. In this figure, a light irradiation chamber 1 is divided by a silica glass window 8 and a wafer 3 is seated on a wafer holding plate 2 for being subjected to heat treatment. The silica glass window 8 is used when the atmosphere in the vicinity of the wafer 3 and the atmosphere in the vicinity of the lamp 4 are different.

Above the silica glass window 8, there are several IR lamps 4 next to one another with a unilateral hermetic seal in a sealing area 6 located on only one end of the lamp. Each lamp 4 is inserted into an optical guide 5 in a state in which the vicinity of its sealing area 6 is supported by a wall 9. A cooling liquid is introduced into the spaces which are formed by the wall 9 and the optical guide 5, each of which forms a respective cooling chamber 7.

When power is supplied to the respective lamp 4, the filament within the lamp 4 emits light. The light is reflected by an inner reflective side of the respective optical guide 5 of stainless steel or the like and is radiated onto the wafer 3 on the wafer holding plate 2 of the light irradiation chamber 1, causing the wafer 3 to be heated. The cooling liquid in the respective cooling chamber 7 cools such that the temperature of the optical guide 5 and of the sealing area 6 of the lamp 4 is not unduly increased by the radiant energy from the lamp 4.

But in this conventional example, it was possible to cool only the optical guides 5 and the sealing areas 6, because there the optical guides 5 and the sealing areas 6 are cooled using heat conduction by the cooling liquid which flows in the cooling chambers 7. The emission part (the silica glass area surrounding the filament) of the lamp 4 could not be adequately cooled in this way.

If the power supplied to the lamps 4 is increased in order to raise the rate of the temperature increase of the wafer to increase the throughput and to shorten the treatment time, there are, therefore, cases in which the temperature of the silica glass which forms the respective emission portion of the lamp 4 rises and reaches a temperature of at least 1000° C.

At a temperature of the silica glass used for the respective emission portion of at least 800° C., recrystallization of the silica glass occurs, as does milky opacification which is called "devitrification." When the temperature of the lamps 4 rises and devitrification of the silica glass occurs, the light from the filaments passes only poorly through the silica glass. The stipulated light energy from the lamps 4 can no longer be radiated onto the wafer 3. As a result, there were cases in which the device did not work effectively as a heating device.

SUMMARY OF THE INVENTION

The invention was devised to eliminate the above described defect in the prior art. Therefore, a first object of the invention is to devise a heat treatment device of the light irradiation type with a long service life in which effective, adequate cooling of the lamps prevents devitrification of the lamp emission portion, even if the power supplied to the lamp is increased to accelerate the temperature increase of the wafer.

A second object of the invention is to devise a heat treatment device of the light irradiation type in which the lamps can be cooled effectively and adequately and the number of lamps per unit of area can be increased to accelerate the temperature increase of the wafer.

A third object of the invention is to devise a heat treatment device of the light irradiation type with a long service life, in which the light energy can be effectively used by preventing a temperature increase of the sealing areas of the lamps.

The objects are achieved as claimed in the invention as follows:

A heat treatment device of the light irradiation type in which light is radiated from lamps and thus heating takes place comprises the following:

- a mirror in which several lamps with a unilateral hermetic seal located next to one another;
- air injection lines for cooling air located in the above described mirror for cooling of these several lamps; and
- at least one air exhaust line for blowing out the above described cooling air which has been blown in.

Furthermore, the objects are achieved in the above described heat treatment device of the light irradiation type in that the above described at least one air exhaust line is located in the above described mirror in order to blow out the above described cooling air from the vicinity of the lamps.

Moreover, the objects are achieved in the above described heat treatment device of the light irradiation type in that the lamps are located in a lamp chamber which surrounds the above described mirror and there is at least one air exhaust line in one side wall of the lamp chamber.

In addition, the objects are achieved in the above described heat treatment device of the light irradiation type in that the air exhaust line is comprised of several air lines which surround the outside peripheral surfaces of the lamps.

Furthermore, the objects are achieved in the above described heat treatment device of the light irradiation type in that there is a reflection component between the filament and the sealing area in the lamps.

In the following the invention is specifically described using several embodiments which are shown in the drawings.

DETAILED DESCRIPTION OF THE INVENTION

Figure 1:
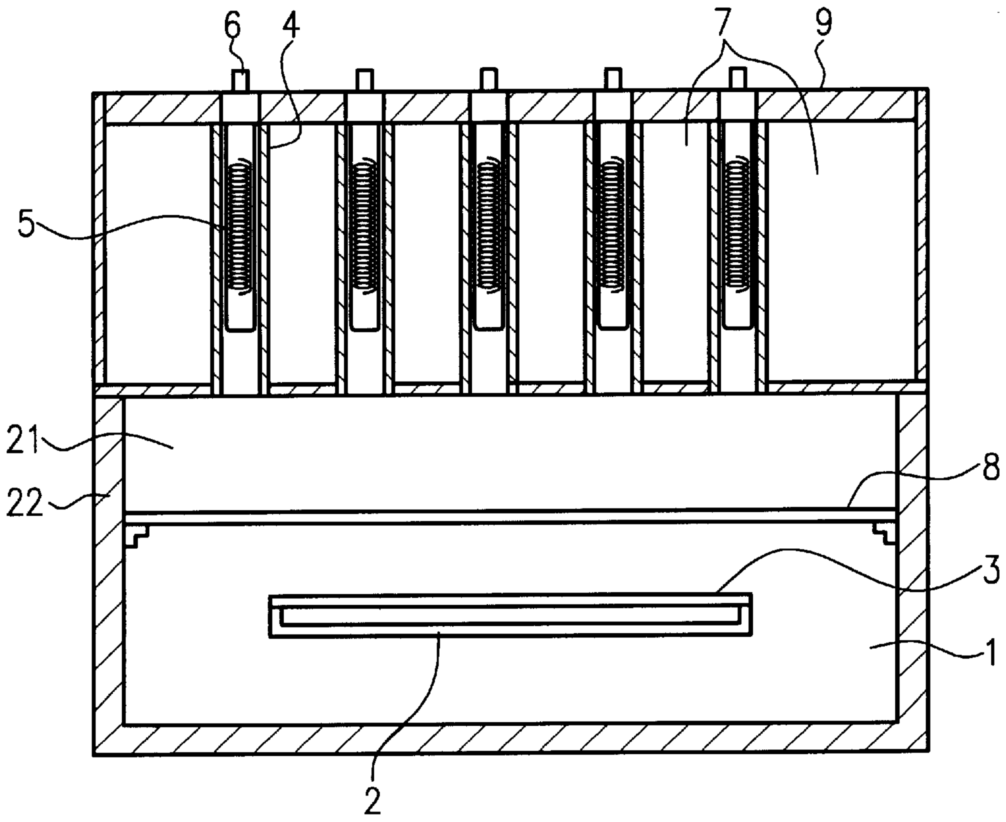
Fig.1 (Prior Art)
FIG. 1 shows a schematic cross section of a conventional heat treatment device of the light irradiation type.
Figure 2:
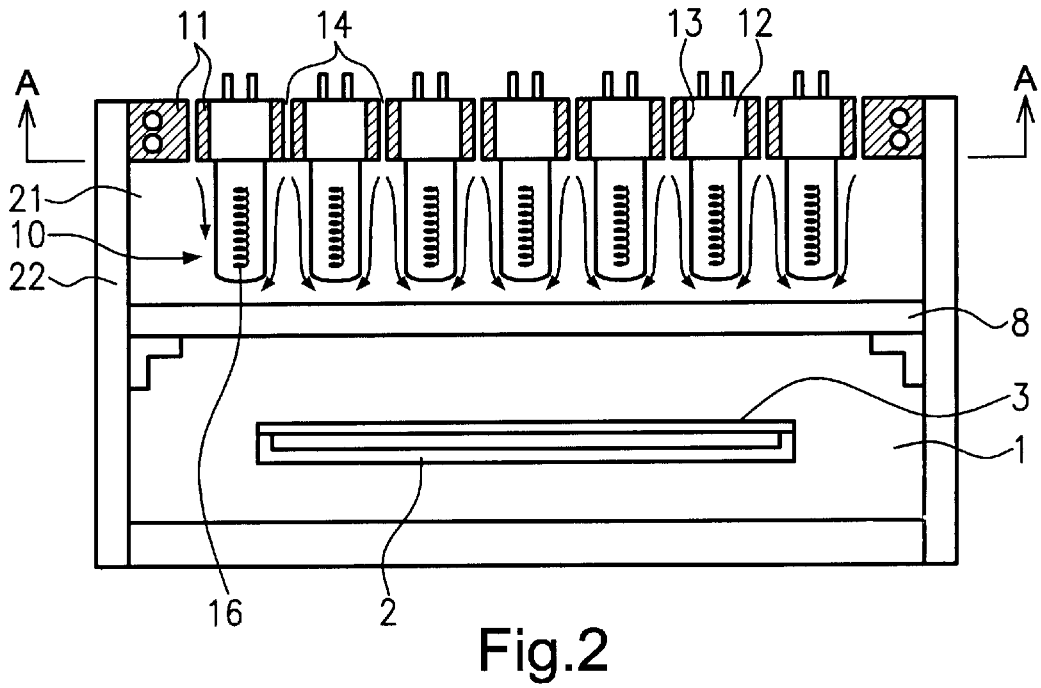
FIG. 2 shows a schematic cross section of a first embodiment of the invention.
Figure 3:
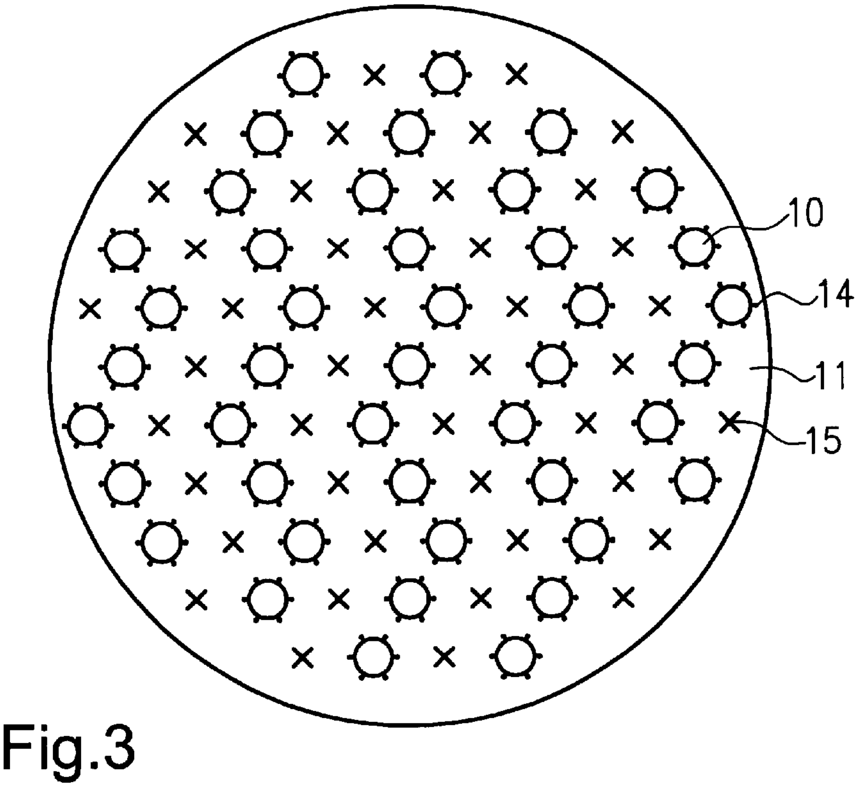
FIG. 3 is a cross-sectional view taken along line A—A in FIG. 2.

FIGS. 2 & 3 show a first embodiment of the invention with is identical to the conventional example with respect to the fact that there are several lamps 10 with a unilateral hermetic seal in each of which there is a filament and which are located next to one another in a mirror 11 such that they are perpendicular to a wafer 3. However, in the first embodiment, there are sleeves 12 which cover the vicinity of the sealing areas 20 of the lamps 10, and the lamps 10 are attached in the mirror 11 by installing sleeves 12 in openings 13 of the mirror 11.

In the mirror 11, in the vicinity of the surroundings of the lamps 10, there are air injection lines 14 for cooling the lamps 10 and air exhaust lines 15 (FIG. 3) for blowing the air out of the vicinity of the lamps. Cooling air is supplied to the air injection lines 14 from a cooling fan, an air pressure pump (not shown) or the like. Thus, the vicinity of the lamps 10 is cooled. An air exhaust fan (not shown) is connected to the air exhaust lines 15. In this way, the air is withdrawn from the vicinity of the lamps.

In FIG. 3, each of the air injection lines 14 is designated by a "." and each air exhaust line 15 by an "x". FIG. 3 also shows the arrangement of the lamps 10 on the mirror 11, the air injection lines 14 and the air exhaust lines 15 relative to one another. The air injection lines 14 are located in the vicinity of the lamps 10 such that they surround the lamps 10. In this way, the emission portions of the lamps 10 are intensely exposed to cooling air, and therefore, are effectively cooled. It is even more efficient if the air injection lines 14 are directed toward the lamps 10 so that cooling air is blown against the emission portions of the lamps 10.

When the lamps 10 are in operation, air is supplied to the air injection lines 14 by a cooling fan, and thus, the lamps 10 are cooled. The cooling air which flows into the vicinity of the lamps 10 from the air injection lines 14 continues to flow, from the sealing areas 20, along the vicinity of the emission portions of the lamps 10. On the other hand, negative pressure is applied to the air exhaust lines 15 by an air exhaust fan, causing forced evacuation. The air is drawn in by the air exhaust lines 15 and is thus evacuated.

The emission portion of the respective lamp 10 is cooled directly with high efficiency by blowing in cooling air in this way from the sealing areas 20 of the lamps 10 along the surfaces of the emission portions. Therefore, the temperature of the silica glass which forms the emission portions is prevented from reaching 800° C. or more, even if several lamps 10, which are located adjacently, are operated at the same time. Thus, high power can be supplied to the lamps without devitrification of the silica glass.

Figure 4:
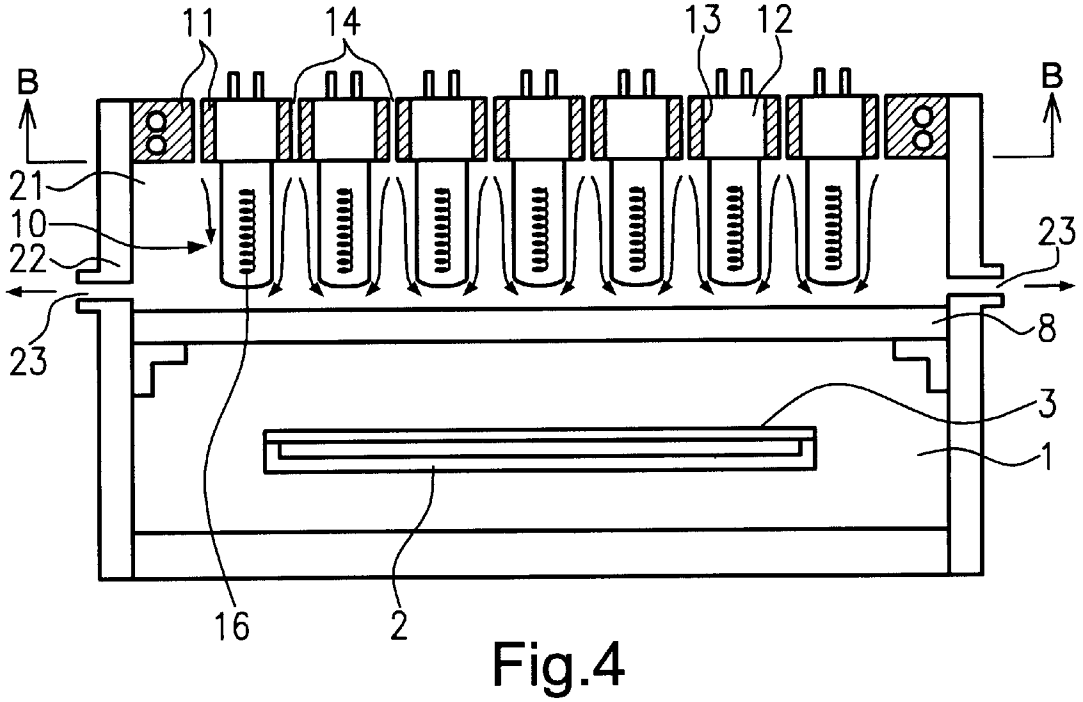
FIG. 4 is a schematic cross section of a second embodiment of the invention.
Figure 5:
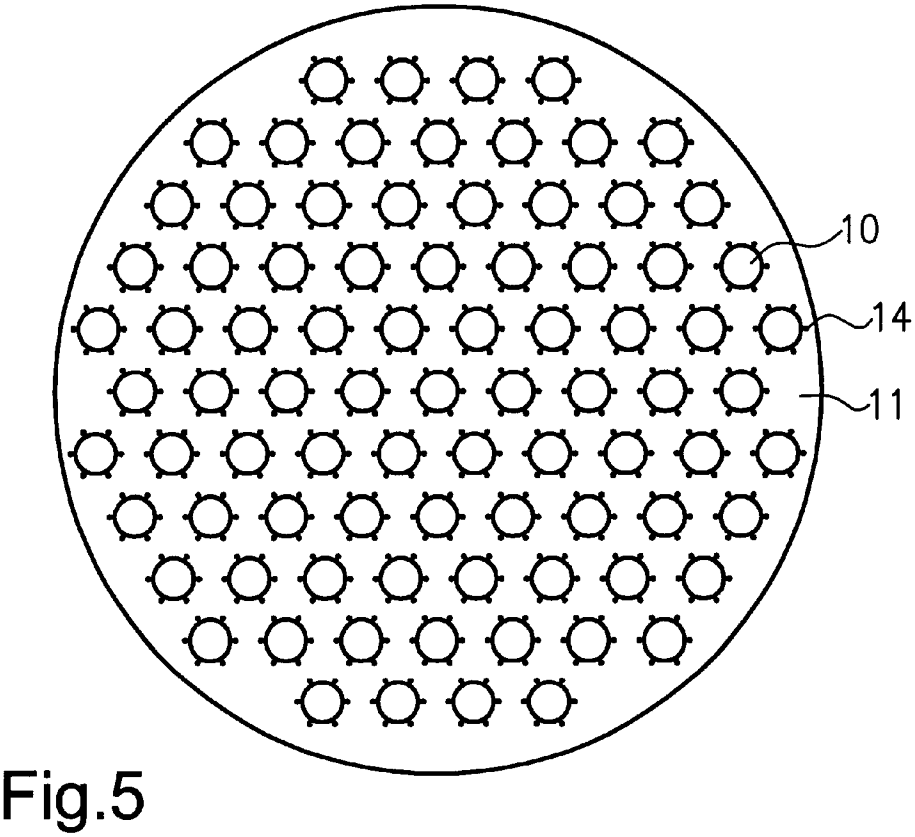
FIG. 5 is a cross-sectional view taken along line B—B in FIG. 4.

FIGS. 4 & 5 show a second embodiment of the invention. Here, there also are air injection lines 14 for cooling the lamps 10 in the mirror 11. However, instead of providing exhaust lines 15 in the mirror, air exhaust lines 23 for evacuation of the lamp chamber 21 are located in side walls 22 of the lamp chamber. FIG. 5 shows the arrangement of the lamps 10 on the mirror 11 and the air injection lines 14 relative to one another. The air injection lines 14 are located in the vicinity of the lamps 10 such that they surround the lamps 10. In this way, the emission portions of the lamps 10 are intensely exposed to cooling air and thus effectively cooled as in the first embodiment. It is even more effective if the air injection lines 14 are directed toward the lamps 10 so that cooling air is blown onto the emission portions of the lamps 10.

When the lamps 10 are in operation, air is supplied to the air injection lines 14 by a cooling fan, and thus, the lamps 10 are cooled. The cooling air which flows into the vicinity of the lamps 10 from the air injection lines 14 continues to flow from the sealing areas 20 along the, vicinity of the emission portions of the lamps 10. On the other hand, negative pressure is applied to the air exhaust lines 23 which are located in the side walls 22 of the lamp chamber by an air exhaust fan, causing forced evacuation. The air is drawn by the air exhaust lines 23 and is thus evacuated as in the first embodiment.

Since the emission portion of the respective lamp 10 is cooled immediately and efficiently in this way by blowing in cooling air from the sealing areas 20 of the lamps 10 along the surfaces of the emission portions, the temperature of the silica glass which forms the emission portions can be prevented from reaching a temperature 800° C. or higher even if several lamps 10 which are located adjacently are operated at the same time. Thus, high power can be supplied to the lamps without devitrification of the silica glass.

Furthermore, it is not necessary for there to be an air exhaust line on the mirror surface due to the arrangement of the air exhaust lines 23 in the side walls 22 of the lamp chamber. In this way, the number of lamps per unit of area can be increased and the temperature increase of the wafer further accelerated.

Figure 6:
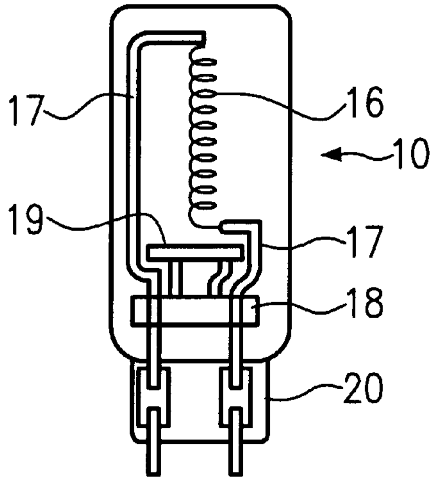
FIG. 6 shows a schematic of a lamp which has reflection components in accordance with the invention.

Furthermore, as in FIG. 6, the lamp 10 can be provided with a reflection component 11 and a unilateral hermetically sealed glass piece 18 which supports an inner lead line 17. The reflection component 19 is made of a material with a high melting point, such as, for example, tungsten, molybdenum or the like. In this way, if the reflection component 19 in the lamp 10 is located between a filament 16 and the sealing area 20, the light from the filament 16 can also be reflected by the reflection component 19 in the direction to the wafer 3. Therefore, the radiant energy of the lamp 10 can be used with high efficiency. Additionally, a temperature increase of the sealing area 20 can be prevented because the light from the filament 16 does not reach the sealing area 20. Thus, oxidation of the film of the sealing area 20 can be prevented. This enables a long service life of the lamp. The reflection component 19 be given a high gloss polishing in order to increase its light reflection efficiency even more.

The emission portions of the lamp can be reliably cooled in a heat treatment device of the light irradiation type with this arrangement. Thus, a heat treatment device of the light irradiation type with a long service life can be devised without devitrification occurring in the lamp emission portions even if the lamp input power is increased to accelerate the temperature increase of the wafer.

Action of the Invention

In a first version of the invention, there are several lamps with a unilateral seal next to one another in a mirror, and furthermore, in the mirror, there are air injection lines for cooling the lamps and at least one air exhaust line for evacuation of the air injected into the lamp vicinity. In this way, the lamp emission portions are reliably cooled. Thus, the wafer can be heated without devitrification of the lamp emission portions even if the lamp input power is increased to accelerate the temperature rise of the wafer.

In the second version of the invention, there are several lamps with a unilateral seal located next to one another in a mirror, and furthermore, in the mirror, there are air injection lines for cooling the lamps, and in the side walls of the lamp chamber, there is at least one air exhaust line. In this way, the lamp emission portions are also reliably cooled. This prevents, devitrification from occurring in the lamp emission portions even if the lamp input power is increased. Thus, the number of lamps per unit of area can be increased and the rate of temperature increase of the wafer can be increased even more.

In the third version of the invention, there are several air injection lines arranged such that they surround the outside peripheral surfaces of the lamps. Thus, the lamps are cooled with high efficiency.

In still another version of the invention, within each lamp, there is a reflection component between the filament portion and the sealing area. Thus, the light emitted in the direction to the sealing area can be reflected in the direction to the wafer, and therefore, the radiant energy from the lamps can effectively be used to heat the wafer. Furthermore, a temperature increase of the sealing area can be prevented because the light from the filaments is no longer radiated onto the sealing areas. Thus, oxidation of the foil seal can be prevented, enabling a long service life of the lamps.

What we claim is:

1. Heat treatment device in which light is emitted from lamps is radiated toward a workpiece to heat it, comprising:

a lamp chamber a mirror located within the lamp chamber in which a plurality of lamps with a unilateral hermetic seal are located next to one another and are oriented perpendicular to said workpiece;

air injection lines located in the mirror for blowing in cooling air into a vicinity of the lamps for cooling of said lamps; and at least one air exhaust line located in the mirror in order to route the cooling air out of the vicinity of the lamps and out of the lamp chamber.

2. Heat treatment device in which light is emitted from lamps and is radiated toward a workpiece to heat it, comprising:

a mirror in which a plurality of lamps with a unilateral hermetic seal are located next to one another and are perpendicular to said workpiece;

air injection lines located in the mirror for blowing in cooling air into a vicinity of the lamps for cooling of said lamps; and at least one air exhaust line located in the mirrror for drawing out the cooling air which had been blown in, wherein said air injection lines comprise a plurality of air lines which surround peripheral surfaces of the lamps.

3. Heat treatment device in which light is emitted from lamps and is radiated toward a workpiece to heat it, comprising:

a mirror in which a plurality of lamps with a unilateral hermetic seal are located next to one another and are perpendicular to said workpiece, wherein the lamps are located in a lamp chamber which surrounds the mirror;

air injection lines located in the mirror for blowing in cooling air into a vicinity of the lamps for cooling of said lamps wherein said air injection lines comprise a plurality of air lines which surround peripheral surfaces of the lamps, at least one air exhaust line located in at least one side wall of the lamp chamber for drawing out the cooling air which had been blown in.

4. Heat treatment device as claimed in claim 1, wherein a light reflection component is located in each of the lamps between a light emitting filament and a sealing area of the lamps.

5. Heat treatment device as claimed in claim 2, wherein a light reflection component is located in each of the lamps between a light emitting filament and a sealing area of the lamps.

6. Heat treatment device as claimed in claim 4, wherein said light reflection component is supported on a glass plate in which leads for the filament are supported.

7. Heat treatment device as claimed in claim 5, wherein said light reflection component is supported on a glass plate in which leads for the filament are supported.

8. Heat treatment device as claimed in claim 1, wherein said air injection lines comprise a plurality of air lines which surround peripheral surfaces of the lamps.

* * * * *